(12) United States Patent
Chandrashekhara et al.

(10) Patent No.: US 11,693,598 B2
(45) Date of Patent: Jul. 4, 2023

(54) UNDEFINED TARGET VOLUME INPUT/OUTPUT (IO) OPTIMIZATION

(71) Applicant: Dell Products L.P., Round Rock, TX (US)

(72) Inventors: Sandeep Chandrashekhara, Shrewsbury, MA (US); Michael Ferrari, Douglas, MA (US); Mark Halstead, Holliston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/513,048

(22) Filed: Oct. 28, 2021

(65) Prior Publication Data

US 2023/0136918 A1      May 4, 2023

(51) Int. Cl.
*G06F 3/06* (2006.01)

(52) U.S. Cl.
CPC ............ *G06F 3/0659* (2013.01); *G06F 3/061* (2013.01); *G06F 3/065* (2013.01); *G06F 3/0664* (2013.01)

(58) Field of Classification Search
CPC .... G06F 3/0613; G06F 3/0619; G06F 3/0631; G06F 3/065; G06F 3/0653; G06F 3/0659; G06F 3/067
See application file for complete search history.

(56) References Cited

U.S. PATENT DOCUMENTS

2022/0121374 A1*   4/2022   Chandrashekhara ....................... G06F 3/0653

* cited by examiner

*Primary Examiner* — Yong J Choe
(74) *Attorney, Agent, or Firm* — Krishnendu Gupta; Nikhil Patel

(57) ABSTRACT

Aspects of the present disclosure relate to improving response rates of input/output (IO) requests targeting undefined virtual storage devices. In embodiments, an (IO request can be received by a storage array. Additionally, a determination of whether the IO request targets an undefined target track can be made. Further, source data related to the IO request can be located. For instance, a direct image lookup (DIL) can be performed to locate the source data. Also, a storage-related operation on the undefined target track can be performed using instructions provided by the IO request, such as updating a version of the undefined track. Further, a storage resource allocation for the undefined target track can be destaged.

18 Claims, 5 Drawing Sheets

UNDEFINED TARGET VOLUME INPUT/OUTPUT (IO) OPTIMIZATION

BACKGROUND

A company can produce vast amounts of data. Accordingly, the company can use a block, file, or object-based storage array (e.g., cloud storage) that uses multiple storage drives to store the data. Additionally, the company can often edit/change data and maintain copies of previous data versions. Therefore, the company can implement a storage array that has a data backup and version management systems. These systems can take periodic snapshots of data. Thus, the company can access a snapshot to obtain lost data or previous data versions.

SUMMARY

Aspects of the present disclosure relate to improving response rates of input/output (IO) requests targeting undefined virtual storage devices. In embodiments, an (IO request can be received by a storage array. Additionally, a determination of whether the IO request targets an undefined target track can be made. Further, source data related to the IO request can be located. For instance, a direct image lookup (DIL) can be performed to locate the source data. Also, a storage-related operation on the undefined target track can be performed using instructions provided by the IO request, such as updating a version of the undefined track. Further, a storage resource allocation for the undefined target track can be destaged.

In embodiments, parsing the IO request's metadata can determine the IO request's target snapshot. In some examples, the IO request's target snapshot can correspond to a host-visible logical disk. Further, the IO request can be modified to include source data information in the undefined target track's metadata.

In embodiments, one or more snapshots of the least one host-visible logical disk can be taken. Furthermore, the host-visible logical disk can define a logical representation of one or more portions of the storage array's physical disk storage space.

In embodiments, the IO request can be modified to insert the source information in the undefined target track's metadata by adding write metadata instructions to the IO request.

In embodiments, write metadata instructions can be added to the IO request by inserting the write metadata instructions to at least one of the IO request's available metadata fields or appending an instructions parameter field to the IO request's data packet.

In embodiments, the snapshots can be taken according to a snapshot schedule. Additionally, the snapshots can be stored in one or more of the storage array's storage resources, including memory or disk.

In embodiments, a chain of each stored snapshot can be established. The chain can define a snapshot hierarchy.

In embodiments, the snapshot hierarchy can be defined by sequentially ordering the chain's snapshots, wherein ordering the chain's snapshots includes ordering the snapshots based on at least a timestamp related to each chained snapshot. Further, the snapshots can be ordered based on at least a timestamp related to each chained snapshot.

In embodiments, the host-visible logical disk can be provided with a new device identifier. Additionally, the device identifier can be updated in response to taking each snapshot.

In embodiments, a determination can be made regarding whether an IO request targets an undefined target track by comparing the device identifier with the IO request's target device identifier. In some examples, the device identifier can define a device-level sequence. Further, the IO request's target can be determined by provisioning a snapshot logical device or performing a DIL operation to determine that the undefined target track corresponds to the snapshot logical device.

DETAILED DESCRIPTION

A business like a financial or technology corporation can produce large amounts of data and require sharing access to that data among several employees. As such, these companies often use storage arrays that deliver block-based storage, file-based storage, or object storage. Because a storage array uses multiple storage drives (e.g., hard-disk drives (HDD) and solid-state drives (SSD)), a company can scale (e.g., increase or decrease) and manage storage capacity more efficiently than storage solutions delivered by a server. In addition, a company can use a storage array to read/write data required by one or more business applications.

A business can change (e.g., edit, replace, delete) data stored in an array. Additionally, a business can experience a data loss or corruption event. In either case, the business may want to access a previous data version. Accordingly, the business can use an array having a storage management (SM) system that manages data backups and versions for each of the company's virtual storage (VS) devices. For example, the SM system can periodically take VS device snapshots for each company host (e.g., a client device or application). Accordingly, the array must provide each host's VS device with new physical storage resources, so an IO write request received after a snapshot does not overwrite the snapshot's data. In many circumstances, an array may not receive an IO write request related to some of the snapshot's data and, thus, corresponding storage resources. As such, SM systems do not allocate new resources until the array receives an IO write request to avoid unnecessarily tying up storage resources.

Accordingly, the SM system identifies each IO request targeting snapshot data to have an undefined VS target, requiring a new storage resource allocation. In such circumstances, current SM systems perform a series of replication intercept operations synchronously before accepting the IO write request. Specifically, current SM systems first temporarily buffer the IO request. Second, the SM systems perform the replication operations synchronously required to allocate a new storage resource to store the IO write request's data. Third, the SM systems hold a physical storage track (e.g., set the track as write pending) to prevent unrelated data writes from using the physical track before accepting the IO write request. However, such synchronous replication operations hinder the array's performance (e.g., response times and throughput).

Aspects of the present disclosure relate to improving response rates of input/output (IO) requests having an undefined VS target. In embodiments, a resource manager (RM) improves the performance of IO requests targeting an undefined target volume at any depth of a snapshot chain. For example, the embodiments can use one or more asynchronous replication operations, as discussed in greater detail herein.

Figure 1:
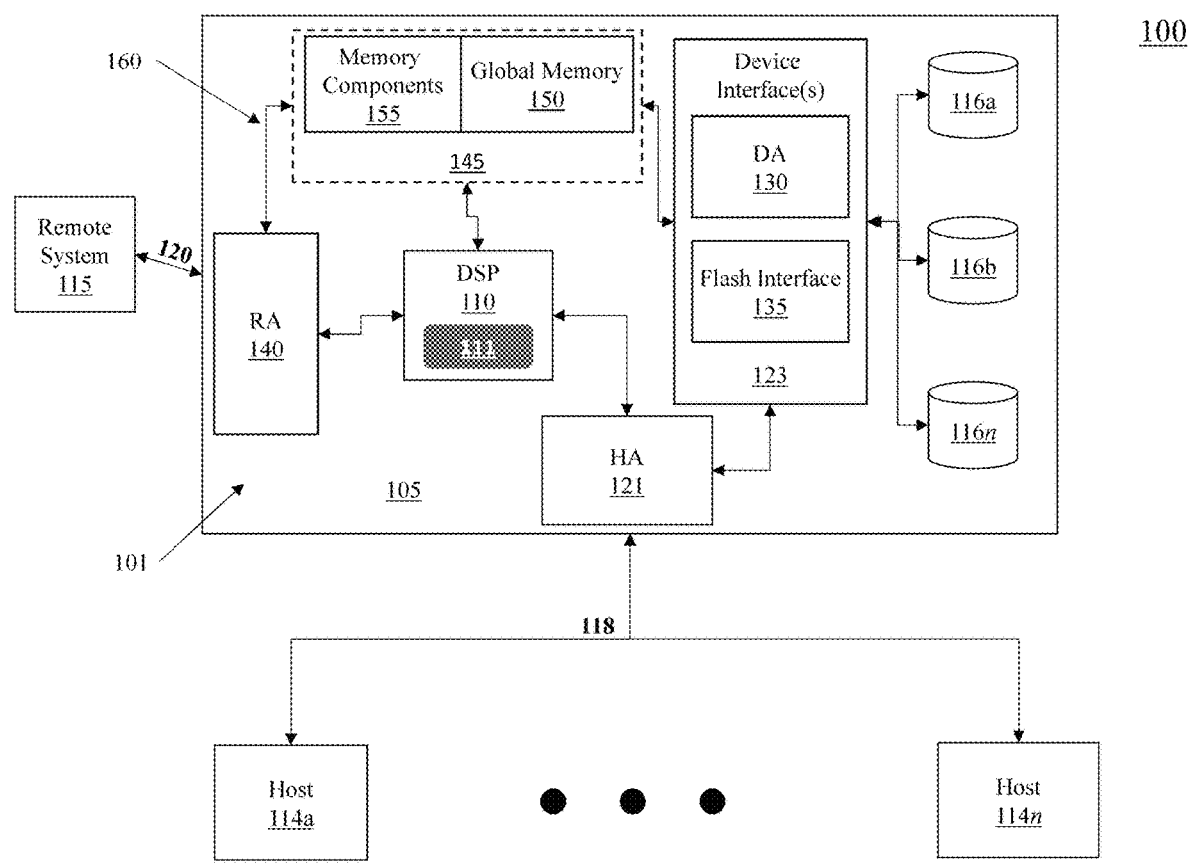
FIG. 1 is a block diagram of a storage array in accordance with embodiments of the present disclosure.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, the array 105 and host systems 114a-n can define a first communication network 118. Further, the first network's topology can have the hosts 114a-n and the array 105 physically co-located or remotely located from one another. Likewise, the array 105 and a remote system 115 can define a second communication network 120. Additionally, the array's RA 140 can manage communications between the array 105 and an external storage system (e.g., remote system 115) using the networks 118, 120. The networks 118, 120 can be a wide area network (WAN) (e.g., Internet), local area network (LAN), intranet, Storage Area Network (SAN)), Explicit Congestion Notification (ECN) Enabled Ethernet network and the like.

In further embodiments, the array 105 and other networked devices (e.g., the hosts 114a-n and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The networked devices 105, 115a-n, 116, and the like can connect to the networks 118,120 via a wired/wireless network connection interface, bus, data link, and the like. Further, the networks 118, 120 can also include communication nodes that enable the networked devices to establish communication sessions. For example, communication nodes can include switching equipment, phone lines, repeaters, multiplexers, satellites, and the like.

In embodiments, the array's components 101 can receive and process input/output (IO) workloads. An IO workload can include one or more IO requests (e.g., read/write requests or other storage service-related operations) originating from the hosts 114a-n or remote system 115. For example, one or more of the hosts 114a-n can run an application that requires a read/write of data to the array 105.

In embodiments, the array 105 and remote system 115 can include a variety of proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to an array component 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Data Services Processor (DSP) 110 can manage access to the array's local memory 145. In additional embodiments, the array's DSP 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile or nonvolatile memory. Unlike nonvolatile memory, volatile memory requires power to store data. Thus, volatile memory loses its stored data if the array 105 loses power for any reason. The primary memory can include dynamic (RAM) and the like in embodiments, while cache memory can comprise static RAM, amongst other similar memory types. Like the array's storage devices 116a-n, the array's memory 145 can have different storage performance capabilities.

In embodiments, a service level agreement (SLA) can define at least one Service Level Objective (SLO) the hosts 114a-n require from the array 105. For example, the hosts 115a-n can include host-operated applications that generate or require data. Moreover, the data can correspond to distinct data categories, and thus, each SLO can specify a service level (SL) for each category. Further, each SL can define a storage performance requirement (e.g., a response time and uptime).

Figure 1A:
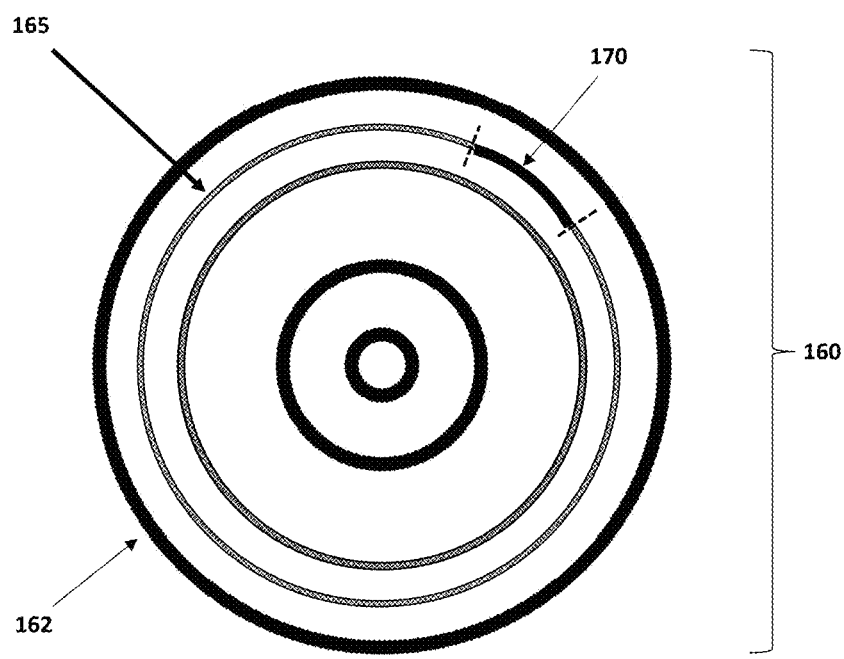
FIG. 1A is a cross-sectional view of a hard disk drive (HDD) in accordance with example embodiments of the present disclosure.

Regarding FIG. 1A, the array 105 can persistently store data on one of its storage devices 116a-n. For example, one of the array's storage devices 116a-n can include an HDD 160 having stacks of cylinders 162. Further, a cylinder 162, like a vinyl record's grooves, can include one or more tracks 165. Thus, the storage array 105 can store data on one or more portions of a disk's tracks 165.

Figure 3:
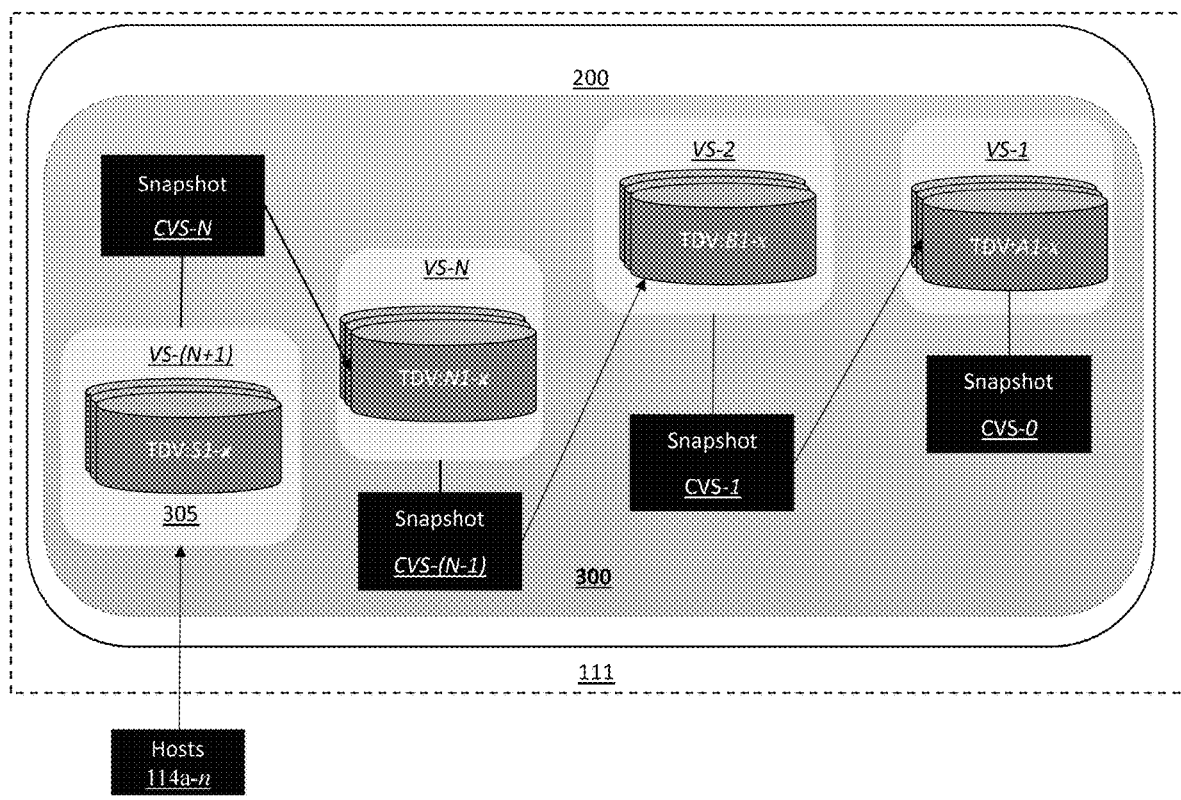
FIG. 3 is a block diagram of a resource management (RM) processor per embodiments of the present disclosure

In embodiments, the HA 121 can expose and provide each host 114a-n logical unit number (LUN), defining a virtual device (e.g., a virtual volume 305 of FIG. 3). The virtual storage device can logically represent portions of at least one physical storage device 116a-n. For example, the DSP 110 can define at least one logical block address (LBA) representing a segmented portion of a disk's track 165 (e.g., a disk's sector 170). Further, the DSP 110 can establish a logical track or track identifier (TID) by grouping together one or more sets of LBAs. Thus, the DSP 110 can define a LUN using at least one TID. In addition, the DSP 110 can create a searchable data structure, mapping logical storage representations to their related physical locations. As such, the HA 121 can use the mapping to direct IO requests by parsing a LUN or TID from the request's metadata.

In embodiments, the array's DSP 110 can establish a storage/memory hierarchy based on one or more of the SLA and the array's storage/memory performance capabilities. For example, the DSP 110 can establish the hierarchy to include one or more tiers (e.g., subsets of the array's storage/memory) with similar performance capabilities (e.g., response times and uptimes). Thus, the DSP-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

Further, the DSP 110 can include a resource manager (RM) 111 that manages the array's memory and storage resources (e.g., global memory 150 and storage drives 116a-n). For instance, the RM 111 can have a logic/circuitry architecture that processes input/output (IO) requests with an undefined VS target asynchronously, as described in greater detail herein.

Figure 2:
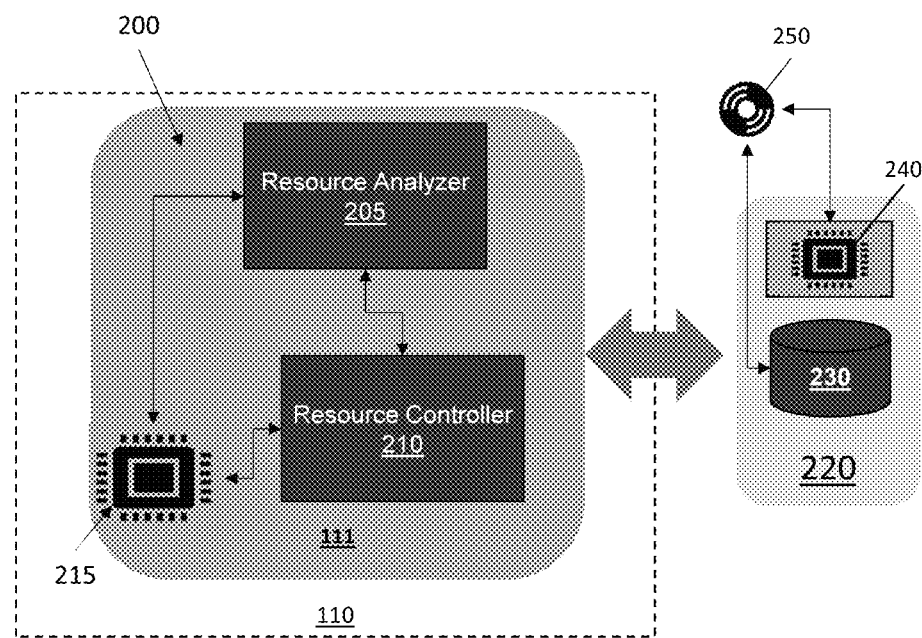
FIG. 2 is a block diagram of a storage resource manager in accordance with embodiments of the present disclosure.

Regarding FIG. 2, a storage array 105 can include a DSP 110 that manages one or more of the array's resources (e.g., memory, storage, and processing resources 225). In embodiments, the DSP 110 can provision virtual storage (VS) resources 220 for a host 114a-n. For example, the VS resources 220 can include a VS device 230 and virtual memory 240. The VS device 230 can represent one or more portions of the array's physical storage devices (e.g., storage devices 116a-n of FIG. 1). Further, the virtual memory 240 can represent one or more cache slots of the array's global memory (e.g., memory 150 of FIG. 1).

In embodiments, the DSP 110 can include a resources manager (RM) 111 that manages the host's VS device 225. For example, the RM 111 can include a resource analyzer (RA) 205 that monitors and analyzes the VS resources 220. For instance, the RA 205 can identify one or more resource metrics like capacity, virtual-to-physical mappings, allocations, and the like. Additionally, the RA 205 can take snapshots of the VS resources 220 and store them in a local memory 220. The snapshot can include point-in-time metadata specifying data stored by the virtual resources 225 and its related resource metrics. In embodiments, the analyzer 205 can periodically take snapshots by obtaining virtual storage logs (VSLs) from at least one daemon (e.g., the daemon 240). For example, the daemon 240 can record a VS's resource-related metadata according to a reporting schedule. In addition, the log can include resource-related event records occurring during a recording period (e.g., the time between snapshots). The reporting schedule can specify a snapshot duration, start time, or end time for each recording period. Thus, the daemon 240 can deliver its VSL to the RA 205 at the end of each recording period. Further, the daemon 240 can provide each VSL with a unique snapshot ID, defining a snapshot's temporal-related information and relative relationship with previously and subsequently taken snapshots. As such, the RA 205 can use each VSL to specify a sequence and depth of a VS device's snapshot chain (e.g., the snapshot chain 300 of FIG. 3).

As described herein, a company can use a storage array to deliver data backup and disaster recovery services that, e.g., preserve data integrity. For example, if data is lost or corrupt, the company can use one or more snapshots to recover the data. In addition, the array can ensure that snapshot data is immutable (i.e., cannot be changed).

In embodiments, the RM 111 can include a resource controller 210 that dynamically provisions the host's VS resource 220 with new physical storage and memory resource allocations to, e.g., preserve data integrity, amongst other data-related goals. For instance, the controller 210 can create and maintain a resource allocation table, mapping the VS resource addresses (e.g., LUNs, TIDs, LBAs, etc.) to their corresponding physical storage locations (e.g., physical address spaces). For example, the resource allocation table can be a direct image lookup (DIL) inserted into an IO processing path, allowing the array 105 to quickly locate data corresponding to a virtual storage address. Specifically, the DIL can provide virtual addresses with pointers to their stored data's corresponding physical/memory locations.

Accordingly, the RA 205 can create a snapshot using the VS resource's corresponding DIL. For example, the RA 205 can generate metadata defining the VS resource's bit/bytes of stored data using any known technique (e.g., a hashing function). Further, the RA 205 can provide each metadata snapshot record with a virtual-address-to-physical-address pointer using the DIL.

In embodiments, the controller 210 can clear the VS device's corresponding resource allocation lookup table (e.g., DIL) when the RA 205 generates a VS resources snapshot. Accordingly, Thus, if the array 105 receives an IO write with an undefined virtual storage or memory target, the array 105 will not overwrite, edit or change snapshot data. For example, a host 114a-n can issue an IO write request targeting a virtual storage or memory location (e.g., using a TID, LBA, or LUN) for the first time after a snapshot event. In that case, the host-VS resource's lookup table will not include a virtual-address-to-physical-address pointer. As such, the IO write request's virtual storage location is undefined (i.e., it does not have a physical storage/memory allocation).

In embodiments, the controller 210 can dynamically allocate the host's VS resources 220 with new physical storage and memory resources in response to receiving an IO write request with an undefined virtual storage location. For example, the controller 210 can perform asynchronous replication intercept operations that provide the host 114a-n with an acknowledgment response to the IO request before providing the undefined storage location with a physical storage/memory allocation, as described in greater detail herein. As such, the asynchronous intercept operations advantageously improve the array's performance (e.g., response times).

Regarding FIG. 3, an array's DSP (e.g., data services processor 110 of FIG. 1) can provide a host 114a-n with a virtual storage volume (VSV) or logical unit number (LUN) 305. The VSV 305 can have one or more thin storage devices TDV:S1-x with corresponding tracks (e.g., TIDs). Further, each TID can include one or more logical block addresses (LBAs) with corresponding physical storage/memory resource allocations.

In embodiments, the DSP can include a resource manager (RM) 111 that provides the host 114a-n with virtual storage/memory management services. Specifically, the RM 11 can include software/hardware components 200 (e.g., RA 205, controller 210, and local memory 215) that asynchronously process input/output (IO) write requests with undefined VS targets (e.g., TDV, LUN, TID, LBA, etc.).

In embodiments, the RM 111 can provide virtual storage (VS) versioning services. The VS services can include creating VSV versions (VS-(N+1), VS-N, ..., VS-2, VS-1). For instance, the version numbers can monotonically increase such that the largest version number represents a current VSV version. In addition, each VSV version can specify the version's corresponding snapshot and virtual address versions (e.g., track (TID) versions). Thus, in response to taking a VSV snapshot, the RM 111 can create a new current VSV (e.g., VSV 305) with a monotonically increased version number, e.g., VS-(N+1), compared to its predecessors. Accordingly, the RM 111 can specify a snapshot chain 300 identifying the current VSV's sequential snapshot history. For example, the RM 111 can provide each VSV version (VS-(N+1), VS-N, VS-2, VS-1) with a snapshot copy of each version's immediate predecessor (e.g., snapshot copies CVS-N, CVS-(N−1), ..., CVS-1, CVS-0).

In embodiments, the RM 111 can generate a snapshot of a host's VS volume 305 as described by FIG. 2 above in greater detail. Additionally, the RM 111 provides the VS volume 305 with a new version identifier (e.g., number) using a monotonically increasing versioning technique. Further, the RMM 111 can begin provisioning the VS volume with new physical storage/memory allocations in response to receiving an IO write request targeting one or more undefined target VS devices (e.g., this VS devices TDV:S1-x). For example, the RM 111 can parse the IO request's metadata to identify the target VS device's logical address (e.g., track (TID)). Additionally, the RMM 111 can identify the TID's corresponding track sequence (or version) from the metadata.

In embodiments, the RM 111 can compare the current VS volume's version to the track sequence. For example, if the TID's sequence number is less than the target VS device sequence number, the track is undefined, and the RM 111 saves the current DIL image and increases the TID sequence. The RM 111 also reserves a new virtual remote drive protocol (RDP) table allocation node and updates the VS volume's DIL. The RM 111 then accepts the write and issues a response to the host 114a-n that issued the IO request. Subsequently, the RM 111 can parse a target TID and record flags from the request's metadata. Additionally, the RM 111 determines if the TID has a cache allocation.

If there is a negative determination, the RM 111 clears a virtual write-pending status from a track index table and destages the write data to a new physical storage resource allocated from the storage devices 116a-n.

If there is a positive determination, the RM 111 uses the snapshot CSV-N or corresponding DIL to locate the source data from a previous VS device version's physical storage allocation. Further, the RM 111 sets the VS device as write-pending. Subsequently, the RM 111 clears a virtual write-pending status from a track index table and destages the write data to a new physical storage resource allocated from the storage devices 116a-n.

The following text includes details of one or more methods or flow diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the methods described by this disclosure.

Figure 4:
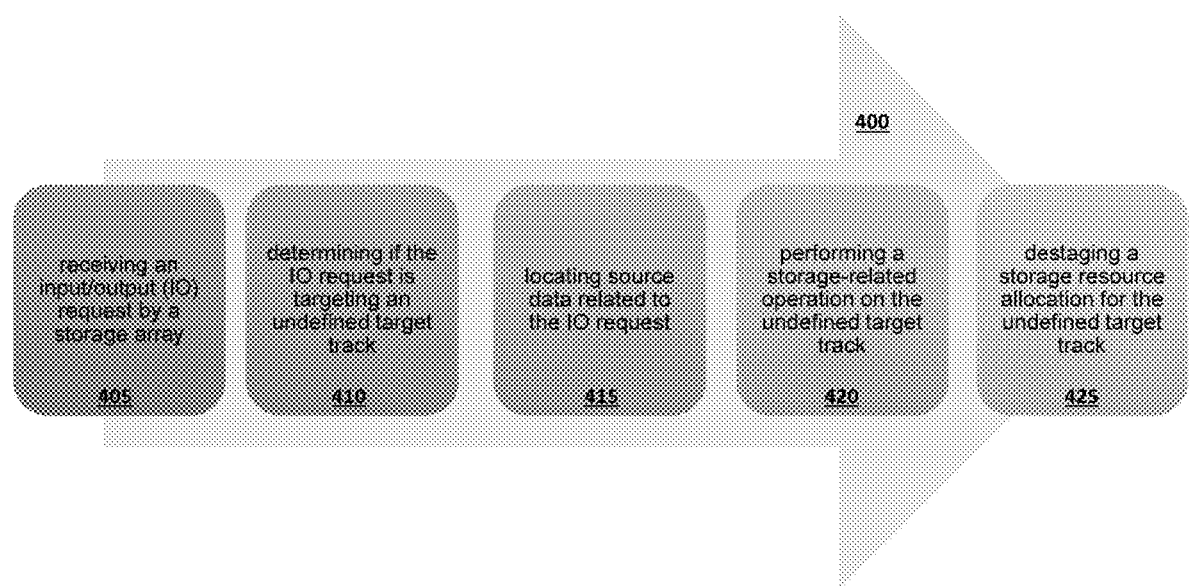
FIG. 4 is a flow diagram of a method for managing virtual storage devices in accordance with embodiments of the present disclosure.

Regarding FIG. 4, one or more of the array's components (e.g., components 101 of FIG. 1) can execute the method 400. The method 400 describes steps for improving the performance of IO requests targeting an undefined target volume at any depth of a snapshot chain. For example, at 405, the method 400 can include receiving an input/output (IO) request by a storage array. The method 400, at 410, can also include determining if the IO request is targeting an undefined target track. Further, at 415, the method 400 can include locating source data related to the IO request.

Additionally, locating the source data can include performing a direct image lookup (DIL). The method 400, at 420, can also include performing a storage-related operation on the undefined target track using instructions provided by the IO request. For example, the storage-related operation can include updating a version of the undefined track. Additionally, at 425, the method 400 can include destaging a storage resource allocation for the undefined target track. It should be noted that each step of the method 400 can include any combination of techniques implemented by the embodiments described herein.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for the execution of a computer program include, by way of example, both general and special purpose microprocessors and any one or more processors of any digital computer. Generally, a processor receives instructions and data from a read-only memory, a random-access memory, or both. Thus, for example, a computer's essential elements are a processor for executing instructions and one or more memory devices for storing instructions and data. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by and/or incorporated in special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system that includes a backend component can also implement the above-described techniques. The backend component can, for example, be a data server, a middleware component, or an application server. Further, a distributing computing system that includes a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, and/or plural forms of each are open-ended, include the listed parts, and contain additional elements that are not listed. Unless explicitly disclaimed, the term 'or' is open-ended and includes one or more of the listed parts and combinations of the listed features.

One skilled in the art will realize that other specific forms can embody the concepts described herein without departing from their spirit or essential characteristics. Therefore, in all respects, the preceding embodiments are illustrative rather than limiting the concepts described herein. The appended claims thus recite the scope of this disclosure. Therefore, all changes embrace the meaning and range of equivalency of the claims.

What is claimed is:

1. A method, comprising:
receiving an input/output (IO) request by a storage array;
determining if the IO request is targeting an undefined target track;
locating source data related to the IO request, wherein locating the source data includes performing a direct image lookup (DIL);
modifying the IO request to include source data information in the undefined target track's metadata and to insert the source information in the undefined target track's metadata by adding write metadata instructions to the IO request;
performing a storage-related operation on the undefined target track using instructions provided by the IO request, wherein the storage-related operation includes updating a version of the undefined track; and
destaging a storage resource allocation for the undefined target track.

2. The method of claim 1, further comprising:
determining the IO request's target snapshot by parsing the IO request's metadata, wherein the IO request's target snapshot corresponds to at least one host-visible logical disk.

3. The method of claim 2, further comprising:
taking one or more snapshots of the least one host-visible logical disk, wherein the host-visible logical disk defines a logical representation of one or more portions of the storage array's physical disk storage space.

4. The method of claim 3, further comprising:
adding the write metadata instructions to the IO request by one of:
inserting the write metadata instructions to at least one of the IO request's available metadata fields, or
appending an instructions parameter field to the IO request's data packet.

5. The method of claim 4, further comprising:
taking the one or more snapshots according to a snapshot schedule, defining a snapshot interval; and
storing the snapshots in one or more of the storage array's storage resources, including memory or disk.

6. The method of claim 5, further comprising:
establishing a chain of each stored snapshot, wherein the chain defines a snapshot hierarchy.

7. The method of claim 6, further comprising:
defining the snapshot hierarchy by sequentially ordering the chain's snapshots, wherein ordering the chain's snapshots includes ordering the snapshots based on at least a timestamp related to each chained snapshot.

8. The method of claim 6, further comprising:
providing the host-visible logical disk with a new device identifier; and
updating the device identifier in response to taking each snapshot.

9. The method of claim 8, further comprising:
determining if the IO request is targeting an undefined target track by comparing the device identifier with the IO request's target device identifier, wherein the device identifier defines a device level sequence;
wherein determining that the IO request is targeting an undefined target track includes one or more of:
provisioning a snapshot logical device, and performing a DIL operation in response to determining that the undefined target track corresponds to the snapshot logical device.

10. An apparatus having a memory and processor configured to:
receive an input/output (IO) request by a storage array;
determine if the IO request is targeting an undefined target track;
locate source data related to the IO request, wherein locating the source data includes performing a direct image lookup (DIL);
modify the IO request to include source data information in the undefined target track's metadata and to insert the source information in the undefined target track's metadata by adding write metadata instructions to the IO request;
perform a storage-related operation on the undefined target track using instructions provided by the IO request, wherein the storage-related operation includes updating a version of the undefined track; and
destage a storage resource allocation for the undefined target track.

11. The apparatus of claim 10, further configured to:
determine the IO request's target snapshot by parsing the IO request's metadata, wherein the IO request's target snapshot corresponds to at least one host-visible logical disk.

12. The apparatus of claim 11, further configured to:
take one or more snapshots of the least one host-visible logical disk, wherein the host-visible logical disk defines a logical representation of one or more portions of the storage array's physical disk storage space.

13. The apparatus of claim 12, further configured to:
add the write metadata instructions to the IO request by one of:
insert the write metadata instructions to at least one of the IO request's available metadata fields, or
append an instructions parameter field to the IO request's data packet.

14. The apparatus of claim 13, further configured to:
take the one or more snapshots according to a snapshot schedule, defining a snapshot interval; and
store the snapshots in one or more of the storage array's storage resources, including memory or disk.

15. The apparatus of claim 14, further configured to:
establish a chain of each stored snapshot, wherein the chain defines a snapshot hierarchy.

16. The apparatus of claim 15, further configured to:
define the snapshot hierarchy by sequentially ordering the chain's snapshots, wherein ordering the chain's snapshots includes ordering the snapshots based on at least a timestamp related to each chained snapshot.

17. The apparatus of claim 15, further configured to:
provide the host-visible logical disk with a new device identifier; and
update the device identifier in response to taking each snapshot.

18. The apparatus of claim 17, further configured to:
determine if the IO request is targeting an undefined target track by comparing the device identifier with the IO request's target device identifier, wherein the device identifier defines a device level sequence;
wherein determining that the IO request is targeting an undefined target track includes one or more of:
provisioning a snapshot logical device, and
performing a DIL operation in response to determining that the undefined target track corresponds to the snapshot logical device.

* * * * *